3,048,566
POLYMERS FROM POLYISOCYANATES AND
PROCESS FOR PRODUCING THEM
Ralph G. Beaman, Wilmington, Del., assignor to E. I.
du Pont de Nemours and Company, Wilmington, Del.,
a corporation of Delaware
No Drawing. Filed Aug. 18, 1958, Ser. No. 755,427
14 Claims. (Cl. 260—77.5)

This invention relates to novel high molecular weight synthetic linear polymers from organic polyisocyanates having vicinal isocyanate groups.

It is well known that isocyanates, that is, organic esters of isocyanic acid, are easily converted under basic catalysis to products of self-addition, with the nature of the products formed depending largely upon the catalysts used. Thus, catalysts such as pyridine and triethylphosphine are known to convert aromatic isocyanates to dimers, which are reported to have the structure of a uretidinedione. Other catalysts, such as sodium carbonate, potassium acetate or triethylamine, give rise to trimers, or isocyanurates, which are known to be six-membered rings. All dimers and trimers from monoisocyanates are cyclic compounds or relatively low molecular weight, and of little or no commercial value for the production of shaped articles.

When diisocyanates are subjected to conditions suitable for dimer and trimer formation, high molecular weight products are often formed as expected, but these products are similarly of little or no commercial value for the production of shaped articles. These polymers are insoluble and highly cross-linked and are not suitable for the fabrication of shaped articles such as filaments and films. Polymer formation via an intermolecular dimerization reaction is limited to aromatic diisocyanates, since aliphatic isocyanates are not known to dimerize, and then the isocyanate groups must be unhindered, i.e., each annular carbon atom adjacent to the carbon atom bearing an isocyanate group must bear one hydrogen if products higher than dimeric structures are to be obtained. Such all-aromatic polymers are linear, but are only very slightly soluble in useful organic media and are relatively reactive toward water and organic solvents, and thus have very limited value for the production of useful shaped articles.

It is, therefore, an object of this invention to provide novel high molecular weight linear polymers which have high melting temperatures and are readily soluble in organic media by the polymerization of selected organic polyisocyanates. Another object of this invention is to provide novel N-substituted polyamides wherein carbonyl groups and nitrogen atoms alternate regularly in the polymer chain and each nitrogen atom is joined to a next nitrogen atom by two connected carbon atoms. A further object of this invention is to provide filaments, films, and other shaped articles from such polymers.

The objects of this invention are accomplished by providing a high molecular weight synthetic linear polymer of an organic monomeric polyisocyanate having at least two vicinal isocyanate groups, but otherwise free of substituents which are reactive with an isocyanate group. The polymer is characterized by a repeating five-membered ring structural unit in which the nitrogen of one of the isocyanate groups is bonded to the carbon atom of an adjacent isocyanate group.

The polymers of this invention may be prepared by polymerizing the organic monomeric polyisocyanates previously described under anhydrous conditions at a temperature below about 75° C., and preferably at 0° C. or lower. The polymerization is preferably carried out in an inert solvent for the polyisocyanate and in the presence of a soluble alkali metal anionic catalyst.

Any organic polyisocyanate having vicinal isocyanate groups may be used including aliphatic, cyclo-aliphatic, and aromatic types. These polyisocyanates may contain other substituents; however, it is apparent that these substituents should not be reactive with the isocyanate groups. By the term "vicinal isocyanate groups" it is meant that the isocyanate groups are attached to adjacent connected carbon atoms, i.e., they bear a 1,2-, 1,2,3-, etc. relationship to each other.

In their simplest form, the polymers of this invention may be represented by the structural formula

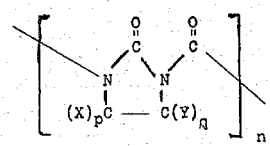

where the two non-carbonyl carbon atoms are adjacent connected carbon atoms of the polyisocyanate monomer, $n$ is an integer greater than 5, $p$ and $q$ are integers from 1 to 2, and X and Y each represent hydrogen atoms or any other combination of substituents satisfying the valence structure of the carbon atoms. The polyisocyanate must be free of any pendant groups or substituents which are reactive with an isocyanate group at the temperatures used in the process of this invention. The products of this invention are therefore N-substituted polyamides having alternate nitrogen atoms and carbonyl groups in the polymer chain, each nitrogen atom being joined to a next nitrogen atom by the same connected carbon atoms which joined the isocyanate groups in the organic polyisocyanate starting material. The polymers contain substantially no free isocyanate functional groups.

In polymerizing polyisocyanates in which more than two vicinal isocyanate groups are present, a fused ring structure of five-membered rings is obtained. For example, the following repeating units make up the polymer chain of the polymer prepared from propane-1,2,3-triisocyanate,

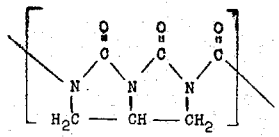

It is indeed surprising that the products of this invention are linear, soluble polymers since heretofore anionic polymerization of diisocyanates in which both isocyanate groups are polymerizable has produced only insoluble, highly branched and cross-linked materials. Such diisocyanates as do give rise to linear, soluble polymers polymerize substantially through a more reactive, unhindered isocyanate group to the exclusion of a less active, sterically hindered isocyanate group, and hence only one isocyanate group takes part in the polymerization. Traces of moisture are therefore sufficient to generate cross-linkages from the pendant isocyanate groups of such polymers.

It is a further surprising feature of this invention that polyisocyanates having vicinal isocyanate groups give linear, soluble polymers through formation of a repeating five-membered ring, while other polyisocyanates, such as 1,3-diisocyanates, give insoluble cross-linked materials instead of linear soluble polymers through formation of a recurring six-membered ring.

The preferred products of this invention are those prepared from aliphatic type polyisocyanates which have vicinal isocyanate functional groups. As previously indicated, these polyisocyanates may contain any substituents which are not reactive with the isocyanate functional groups. The length of the aliphatic chain is not critical.

Polyisocyanates having more than two vicinal isocyanate groups will, as previously described, have polymer chains comprised of fused ring structures of five-membered rings. Such organic polyisocyanates include propane-1,2,3-triisocyanate, hexane-1,2,3-triisocyanate, cyclohexane-1,2,3-triisocyanate, pentane-2,3,4-triisocyanate, butane-1,2,3,4-tetraisocyanate, benzene-1,2,3 - triisocyanate, naphthalene-1,2,3-triisocyanate, toluene-3,4,5 - triisocyanate and the like.

It has been found, however, that polysiocyanates in which any of the isocyanate groups are not vicinal, such as propane-1,3-diisocyanate, hexane-1,6-diisocyanate, hexane - 1,2,6-triisocyanate benzene - 1,3-diisocyanate, benzene-1,3,5-triisocyanate, toluene-2,4,6-triisocyanate, and the like will not give the linear polymers of this invention.

As previously indicated, the carbon atoms bearing the vicinal isocyanate groups may bear any substituent which does not contain active hydrogen atoms. Representative alkyl substituents include methyl, ethyl, propyl, isopropyl, butyl, isobutyl, amyl hexyl, and higher alkyl groups such as undecyl, octadecyl, and the like. Alkylene groups such as dimethylene, trimethylene and tetramethylene, as well as alkenyl groups, such as allyl and decenyl, are also included. Aralkyl groups which are useful in this invention include benzyl, phenylethyl, and phenylalkyl groups containing a large number of carbon atoms in the aliphatic chain, as well as aralkyl groups in which the aryl group is substituted with other alkyl or nonalkyl groups, for example, methoxy, chloro, cyano groups, and the like. Aryl groups such as phenyl and substituted phenyl are also useful. It is preferred that the substituent be lower alkyl. It is surprising and noteworthy that alpha-substitution is permitted in this system while, in contrast, alpha-substituted monoisocyanates do not give high polymers.

Arylene diisocyanates, in which the isocyanate radicals appear on adjacent carbon atoms, may be utilized to advantage in preparing the polymers of this invention although they are less desirable than the diisocyanates in which the isocyanate groups are attached to aliphatic carbon atoms. Thus, vicinal diisocyanates from aromatic hydrocarbons such as benzene, naphthalene, biphenyl, anthracene, phenanthrene, and the like, are included within the scope of the present invention. Representative useful substituents include such groups as methyl, methoxy, chloro, cyano, carboethoxy, and the like.

All of the polyisocyanate monomers used in the practice of this invention may be conveniently prepared by known reactions. The well-known Curtius reaction may be carried out using the appropriate diacid chloride or the appropriate dihydrazide.

In general, the polymerization reaction is preferably carried out at a temperature below about 0° C. in order to obtain a useful yield of high polymer. Moreover, upon completion of the polymerization reaction, it is undesirable to permit the reaction product mixture to stand with catalyst present at room temperature or above for any substantial length of time since depolymerization of the polymeric product sometimes occurs. Generally speaking, the polymerization reaction is carried out at a temperature between about 0° C. and about −100° C. Temperatures below −100° C. may be utilized. Reaction temperatures between about −20° C. and about −50° C. are preferred, giving excellent yields of polymer under relatively convenient reaction conditions.

It is preferred to use a catalyst for the polymerization. Effective catalysts for the polymerization reaction are alkali metal anionic polymerization catalysts which are soluble in the polymerization reaction mixture. Those found most useful include sodium, sodio-naphthalene, sodium ketyls, sodium hydrosulfide and sodium cyanide, particularly when utilized with dimethylformamide as a solvent for the polymerization. The corresponding potassium and lithium compounds, when soluble, are effective also. For example, lithium cyanide is insoluble in dimethylformamide and is ineffective as a catalyst when dimethylformamide is employed as solvent, while lithium is soluble in dimethylformamide and effective as a catalyst in that medium. Sodium dispersions used in the preparation of the first and third catalysts listed above are prepared by high-speed agitation of molten sodium in xylene at 110° C. Sodium in dimethylformamide is then prepared by dissolving about ten drops of the sodium dispersion (50% sodium xylene) in 50 to 100 ml. of dimethylformamide. Sodio-naphthalene is prepared in the usual way by the addition of sodium to a solution of naphthalene in ethylene glycol dimethyl ether. The sodium ketyls of benzophenone or benzophenone derivatives are suitable sodium ketyls, and are prepared by adding approximately one equivalent of a sodium dispersion in xylene to a 1% solution of, for example, benzophenone or 4,4′-dimethoxybenzophenone in ethylene glycol dimethyl ether. Sodium hydrosulfide is prepared by drying commercially available sodium sulfhydrate for several weeks in vacuo. Sodium cyanide in dimethylformamide is prepared by dissolving dry reagent grade sodium cyanide in dry dimethylformamide. Suitable concentrations range from 0.30 to 0.68%. The preferred initiator is sodium cyanide in dimethylformamide. It is easy to prepare and is not inactivated by atmospheric moisture.

The amount of catalyst employed depends upon the amount of monomer to be polymerized. With highly purified monomer and solvent it may be as low as 0.001 mol of catalyst per mol of diisocyanate. The preferred amount is from about 0.005 to about 0.05 mol per mol. Larger amounts may be used, e.g., up to about 0.1 mol, and are sometimes required when impurities which destroy the catalyst are present.

With 1,2-diisocyanates containing no adjacent substituents, however, polymerization often requires no catalyst. Thus, ethane-1,2-diisocyanate polymerizes immediately when added to cold dimethylformamide. It is believed that polymerization of such highly active monomers may therefore be effected by basic solvent, or by adventitious impurities.

Non-reactive organic solvents which do not contain active hydrogen and which are liquid at temperatures below about 0° C. are suitable media for carrying out the polymerization of the organic 1,2-diisocyanates. Suitable solvents include dimethylformamide, triethylamine, dichloromethane, and ethylene glycol dimethyl ether. The preferred reaction medium is dimethylformamide. A mixture of dimethylformamide and dimethylacetamide permits the use of a lower polymerization temperature than that obtainable by the use of dimethylformamide alone. In any case, the monomer and the catalyst if present must be appreciably soluble in the reaction medium at a temperature below 0° C. in order for the best polymerization to occur. The concentration of monomer in the reaction medium may range from about 3% to about 50% by weight or even higher. Monomer concentrations in the reaction mixture are preferably in the range 20% to 25%.

The polymerization reaction is markedly exothermic, and efficient stirring and cooling must be employed to keep the temperature low. It is usually found that the yield of linear polymer increases with decreasing temperature of reaction. Polymerization in bulk is preferably carried out slowly to prevent the formation of bubbles.

The polymers of this invention are of high molecular weight, varying from about 2000 to 50,000 and higher, e.g., up to 400,000, with inherent viscosities in the range from about 0.2 to 2.0 and above. Formation of clear, flexible films is evidence of high molecular weight.

The molecular weight of the organic polymeric products may be controlled by varying the amount of catalyst and the temperature of the polymerization. It has been found that the molecular weight increases steadily as the temperature of polymerization is lowered. This increase in yield and in molecular weight with decreasing temperature is typical of ionic polymerizations. The molecular weight will also depend on the purity of the materials. Because of side reactions with solvent or impurities adventitiously present, in order to obtain polymers of suitably high molecular weight, it is preferred to add the diisocyanate to the solvent medium precooled to the temperature of reaction rather than to mix the two ingredients at room temperature and then cool to reaction temperature.

Infrared absorption spectra of the polymers of this invention are evidence that these polymers contain the basic repeating units

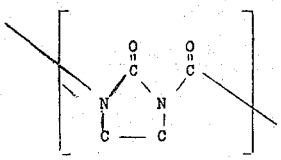

There are no bands in the spectra corresponding to the original isocyanate functions. The presence of two different carbonyls, intra-ring and inter-ring, is evidenced by a characteristic split carbonyl absorption at about 5.6 and 5.9 microns. N-acetyl ethyleneurea has a similar split carbonyl absorption. The split carbonyl absorption rules out an alternate structure

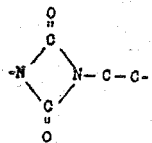

which is not known in the aliphatic series, and which in the aromatic series displays only single absorption at about 5.62 microns. Poly(monoisocyanates) display only single absorption at about 5.86 microns, whereas isocyanate trimers display only single absorption at about 5.60 microns. Depolymerization of the polymers prepared from the 1,2-diisocyanates by thermal cracking regenerates the monomeric 1,2-diisocyanates as evidenced by characteristic odor, infrared absorption, and refractive index, providing further evidence for the above structure. Qualitative and quantitative organic analyses confirm that these polymers have the same elemental composition as the monomeric diisocyanates, but have lost their isocyanate functions.

The polymers of this invention are soluble in a wide variety of solvents, and increasing substitution increases solubility. Thus, for example, the polymer prepared from ethane-1,2-diisocyanate is soluble in a tetrachloroethane/phenol mixture (66/100), and insoluble in such solvents as dimethylformamide, nitromethane, dimethyl sulfoxide, formic acid, N-methylpyrrolidone, while that from its monomethyl derivative, i.e., propane-1,2-diisocyanate, is soluble in all these solvents. For this reason, this polymer is preferred. The polymer prepared from 4-methoxybenzene-1,2-diisocyanate shows similarly improved solubility over its unsubstituted analog. Generally the aromatic polymers are less soluble than the aliphatic polymers and are less easily fabricated to useful structures. It is thus preferred that the isocyanate groups be attached to aliphatic carbon atoms, for example, 1-phenyl-ethane-1,2-diisocyanate is a particularly useful diisocyanate.

The melting temperatures of the polymers of this invention range from about 200° C. to about 350° C., the melting temperature decreasing with increasing size of substitution. Some of the polymers soften at temperatures 50° C. below their melting temperatures because of plasticization by decomposition products. In general, the polymers of this invention exhibit high thermal stabilities and are unchanged after prolonged heating at temperatures of about 150° C. and even higher. They are unchanged chemically by treatment with common organic solvents such as benzene, chloroform, carbon tetrachloride, cyclohexane, alcohol, etc.

The following examples further illustrate the invention and are not to be construed as limitative. Inherent viscosity is calculated as twice the natural logarithm of the relative viscosity where the relative viscosity is calculated by dividing the flow time for a dilute solution of the polymer (0.5 gram/100 ml.) in a capillary viscometer by the flow time for the pure solvent, both being measured at 30° C.

Example I

A mixture of 600 grams of ice, 100 ml. of carbon tetrachloride, 70 ml. of conc. hydrochloric acid, and 57 grams of monomethyl succinhydrazide is stirred while a cold solution of 50 grams of sodium nitrite in 100 ml. of water is dropped in over a period of twenty minutes. Temperature is maintained by external cooling between 0° and 5° C. during the addition and for an additional half hour's stirring. The organic layer is taken up in 500 ml. of benzene and then dried over anhydrous calcium chloride. Two distillations give 19.6 grams of clear, lachrymatory liquid, having a boiling point of 83.5° C. at 25 mm., $N_D^{25.8}=1.4398$, and infrared and elemental analyses consistent with the structure of monomeric propane-1,2-diisocyanate. Its dianilide melts at 238° C. to 240° C., and similarly has consistent infrared and elemental analyses.

Example II

A 100-ml., three-necked flask equipped with a mechanical stirrer, calcium chloride tube and low temperature thermometer is charged with 50 ml. of freshly-distilled, dry dimethylformamide. Monomeric propane-1,2-diisocyanate, 5.2 grams, is stirred into the flask after it is precooled to −38° C. by a Dry Ice-acetone bath. One milliliter of a saturated solution of sodium cyanide in dimethylformamide is then added to the stirred mixture by means of a hypodermic syringe over a period of three minutes. The temperature rises to −14° C. within six minutes after addition of the initiator, while the polymerization mixture assumes the appearance of a smooth gel. The cold bath is removed and the mixture is stirred for one-half hour. The polymer is isolated by precipitation into vigorously stirred methanol. The dried polymer weights 4.6 grams and melts at 287° C. The inherent viscosity of a 0.5% solution of the product in tetrachloroethane/phenol (66/100) is 1.04. Infrared analysis shows split carbonyl absorption at 5.63 and 5.88 microns. A similarly-prepared sample having an inherent viscosity of 0.56 is found to have a number average molecular weight of 45,000 by osmotic pressure measurement on a solution in nitromethane.

Clear, flexible films are cast from nitromethane. Fibers are obtained by wet- and dry-spinning from nitromethane solutions of the polymer.

Example III

According to the method described in Example II, 25 ml. of dimethylformamide is cooled to −35° C. and 5 ml. of cyclohexane-1,2-diisocyanate is added. To the stirred mixture is added 1 ml. of a saturated solution of sodium cyanide in dimethylformamide. After a half hour at −35° C., there is recovered 5.4 grams of colorless polymer which melts at 303° C. and has an inherent viscosity of 0.38 measured in 0.5% solution in tetrachloroethane/phenol mixture (66/100). Infrared analysis shows split carbonyl absorption at 5.63 and 5.88 microns.

Clear, flexible films are cast from pyridine.

Example IV

Apparatus similar to that described in Example II is charged with 30 ml. of freshly distilled, dry dimethylformamide and immersed in a Dry Ice-acetone bath.

When the temperature of the dimethylformamide is −30° C., 50 ml. of ethane-1,2-diisocyanate are added with stirring. Rapid exothermic polymerization occurs without addition of initiator; the temperature rises to −15° C. while white polymer separates. The cold bath is removed, and the stirring is continued for twenty minutes while the mixture is allowed to warm to room temperature. Fifty milliliters of methanol is added, and stirring continued for fifteen minutes. The white fibrous polymer is collected on a filter, washed with methanol, and dried at 40° C. under reduced pressure. The polymer, 5.2 grams, melts at 360° C. and has an inherent viscosity of 0.85 measured as a 0.5% solution in tetrachloroethane/phenol mixture (66/100). The infrared spectrum contains a split carbonyl absorption at 5.6 and 5.9 microns.

*Example V*

Freshly distilled monomeric propane-1,2-diisocyanate is maintained under dry nitrogen in hemispherical glass molds for about two weeks at 0° C. The monomer gradually polymerizes to colorless, glass-clear lenses. They are optically clear, scratch-resistant and hard, having a Rockwell M number of 86. Repeated drops on a hard surface fail to crack, mar, or otherwise damage the lenses. The inherent viscosity is found to be 0.72 measured as a 0.5% solution in tetrachloroethane/phenol mixture (66/100).

A cylindrical glass tube closed at one end is filled with monomeric propane-1,2-diisocyanate, sealed, and allowed to stand at room temperature for one week. Polymerization proceeds sufficiently to allow the glass to be broken away, leaving a clear, hard, solid rod.

*Example VI*

To 8.0 ml. dry dimethylformamide cooled to −30° C. is added 2.01 grams of propane-1,2,3-triisocyanate. One-half milliliter of a saturated solution of sodium cyanide in dimethylformamide is added and the solution is stirred for fifteen minutes at −30° C. The polymerization mixture is poured into about 200 ml. of denatured Formula 2B alcohol, and the polymer, 1.7 grams, is collected on a filter. The polymer has an inherent viscosity of 0.28 measured as a 0.5% solution in sulfuric acid, and has split carbonyl absorption in the infrared at 5.53 and 5.87 microns.

*Example VII*

Twenty-five (25) parts of polymer prepared from propane-1,2-diisocyanate, as described in Example II, having an inherent viscosity of 1.35 are dissolved in 50 parts of 98% formic acid. A portion of this solution is extruded through a spinneret containing 30 holes of 0.005 inch each in diameter into an aqueous coagulating bath. Spinning behavior is excellent and fibers are continuously wound up on a collection bobbin. The fibers, after water washing and drying, are found to be amorphous by X-ray examination. Fiber properties are: tenacity 0.31 gram per denier at 31% elongation with an initial tensile modulus of 14.8 grams per denier.

A portion of the initial solution is touched with a rod and long fibers are drawn out in air. After air-drying, the fibers are found to be cold-drawable three to four times their initial lengths. After stretching, the fibers are found to have increased strength.

*Example VIII*

A portion of the polymer solution of Example VII is spread evenly on a glass plate by means of a doctor knife having a 5-mil clearance. The solvent is evaporated in air at room temperature. Last traces of solvent are removed by heating the film at 70° C. under reduced pressure. A brilliantly clear, flexible, tough film is obtained. It is found to have a density of 1.35 and to have a moisture regain of 5.3% after exposure for forty-eight hours to 65% relative humidity at 70° F.

In addition to the polyisocyanates disclosed in the examples, others which may be used in preparing the novel linear polymers of this invention include 1-cyanoethane-1,2-diisocyanate, 3-cyanopropane-1,2-diisocyanate, 4-cyano-o-phenylene diisocyanate, 1,2-diisocyanatoethyl methyl ether, 1,2-diisocyanatoethyl ethyl ether, 4,5-dimethoxy-o-phenylene diisocyanate, 3-methoxycyclohexane-1,2-diisocyanate, 3-chloro-o-phenylene diisocyanate, 5-nitronaphthalene-2,3-diisocyanate, methyl 3,4-diisocyanatobutyrate, 4-phenoxycyclohexane-1,2-diisocyanate, and 2,3-diisocyanatopropyl 2,4,6-tribromophenyl ether.

The polymers of this invention show excellent resistance to degradation by ultraviolet light. The films and filaments exhibit excellent flexibility at low temperatures and have good electrical insulating properties.

The polymers of this invention are useful in a variety of forms. Because of their resistance to heat, light, and solvents they may be used as coatings for wood, metals, and plastics as well as in the production of shaped articles. The brilliant clarity of films prepared from these polymers makes them particularly desirable for use as decorative and protective covers and wrappers. Since they have good electrical insulating properties, they are particularly useful in electrical applications where they may be used as insulators in the form of molded articles, films, threads, woven and nonwoven cloth, and papers. Solutions of the polymer may be used in varnishes and enamels in electrical applications. Solid objects prepared from these polymers, such as plates, prisms, and lenses find application in optical devices because of their high clarity, toughness, and scratch resistance.

Throughout the specification and claims any reference to parts, proportions and percentages refers to parts, proportions and percentages by weight unless otherwise specified.

It will be apparent that many widely different embodiments of this invention may be made without departing from the spirit and scope thereof, and therefore it is not intended to be limited except as indicated in the appended claims.

I claim:

1. A synthetic linear polymer prepared from an organic polyisocyanate having at least two vicinal isocyanate groups, said polyisocyanate being otherwise free of substituents reactive with an isocyanate group, said polymer having a molecular weight of at least 2000 and consisting essentially of repeating structural units containing five-membered rings, said rings containing two nitrogen atoms joined to a carbon atom of a carbonyl group common to said nitrogen atoms and two interconnected carbon atoms each of which is attached to one of said nitrogen atoms, said interconnected carbon atoms being the carbon atoms which joined the vicinal isocyanate groups in said polyisocyanate, said repeating units being interconnected in the polymer chain by carbonyl groups attached to nitrogens of said rings.

2. A polymer of claim 1 in which said polyisocyanate is an aliphatic polyisocyanate having at least three carbon atoms in the aliphatic chain.

3. A polymer of claim 2 wherein said polyisocyanate is propane-1,2-diisocyanate.

4. A polymer of claim 1 having a split carbonyl absorption in the infrared region at about 5.6 microns and about 5.9 microns.

5. The polymer of claim 1 in the form of a shaped article.

6. A polymer of claim 5 in the form of a fiber.

7. A polymer of claim 5 in the form of a film.

8. The process of claim 13 wherein said reaction medium is comprised of dimethylformamide.

9. The process of claim 13 wherein said catalyst is sodium cyanide.

10. The process of claim 13 wherein said polyisocyanate is an aliphatic polyisocyanate having at least three carbon atoms in the aliphatic chain.

11. The process of claim 10 wherein said polyisocyanate is propane-1,2-diisocyanate.

12. A process for preparing a self-addition synthetic linear polymer having a molecular weight of at least about 2000 which comprises polymerizing as the sole polymerizable ingredient an organic monomeric polyisocyanate having at least two vicinal isocyanate groups at a temperature below about 75° C. under anhydrous conditions in an organic reaction medium free of substituents reactive with an isocyanate group.

13. A process for preparing a self-addition synthetic linear polymer having a molecular weight of at least about 2000 which comprises polymerizing as the sole polymerizable ingredient an organic monomeric polyisocyanate having at least two vicinal isocyanate groups at a temperature below about 75° C. under anhydrous conditions in an organic reaction medium free of substituents reactive with an isocyanate group and in the presence of an alkali metal anionic polymerization catalyst.

14. The process of claim 13 wherein said polymerization is carried out at a temperature between about 0° C. and about —100° C.

References Cited in the file of this patent
UNITED STATES PATENTS

| | | |
|---|---|---|
| 2,620,349 | Slocombe | Dec. 2, 1952 |
| 2,801,230 | Fraser et al. | July 30, 1957 |
| 2,965,614 | Shashoua | Dec. 20, 1960 |